3,271,695
REGENERATIVE OPTICAL PUMPING SYSTEM
John W. Marini, Washington, D.C., assignor to Litton Systems, Inc., College Park, Md.
Filed May 8, 1962, Ser. No. 193,178
5 Claims. (Cl. 331—94.5)

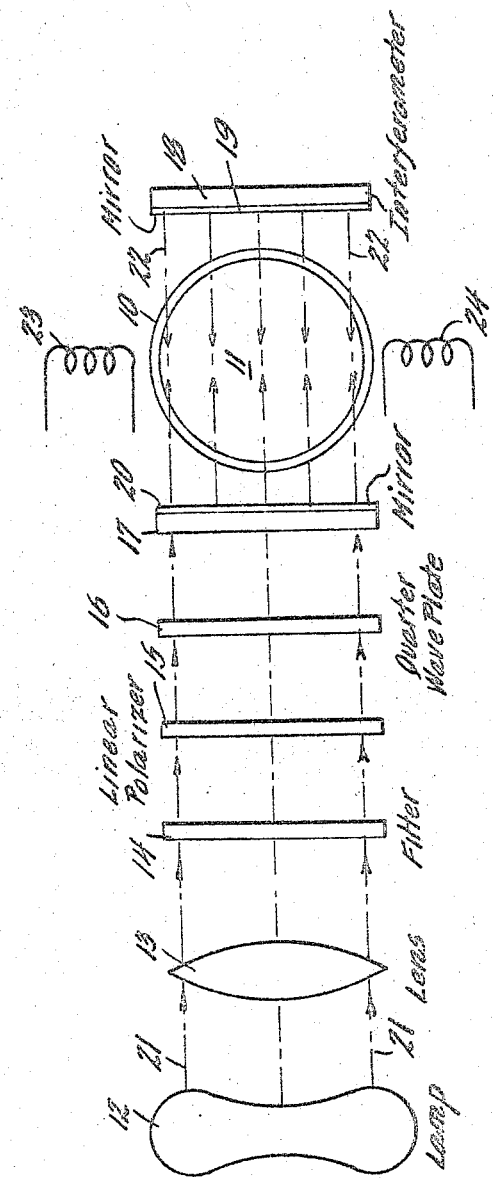

This invention relates to improvements in the optical pumping of microwave resonant mediums and more particularly is directed to improvements in the coupling of the resonant medium to a source of circularly polarized photon energy to provide regenerative application of the photon energy.

It is accordingly a principal object of the invention to provide an improved manner of coupling circularly polarized photon energy to a microwave resonant material.

Stated in another manner, it is an object of the invention to obtain greater energy transfer between a source of circularly polarized photon energy and a resonant medium responsive to such energy thereby to reduce the intensity of the source of photon energy while transferring comparable energy to the medium, or alternatively obtaining a greater transfer of energy to the medium with the same intensity of photon radiation than was heretofore obtainable.

Optical pumping is a term that has been applied to the process of imparting energy to and orienting the atoms of certain resonant mediums, such as the alkali metal vapors, by the use of photon radiation, at frequencies that are resonant with that of the medium. In recent years optically pumped mediums have been employed in microwave amplifiers, oscillators atomic clocks, and magnetometers among many others. One of the serious limitations in the more widespread uses of such devices is the weight, size and intensity requirements of the source of photon radiation which prohibits the use of such apparatus for many portable applications, such as various aircraft uses, where lightweight and small size are premium considerations. Another limitation preventing various desirable uses is the unavailability of sufficiently intense sources of circularly polarized photon radiation that are required for many applications.

Very generally according to the present invention, there is provided an improved apparatus for optical pumping employing the regenerative application of circularly polarized photon radiation to the medium. Considered in one manner, this is performed by repetitively directing the radiation to successively traverse the resonant medium; and considered in a more electrical sense, this is performed by producing a standing wave of photon radiation in the medium. By this process a considerably more efficient transfer of energy between the circularly polarized radiation and the medium is obtained permitting considerable reductions in the intensity, and hence in the size and weight of the source of photon radiation. Alternatively using available light sources, a greater transfer of energy may be obtained than heretofore, equivalent to that formerly provided by a more intense light source.

Other objects and additional advantages will be more readily appreciated by those skilled in the art after a detailed consideration of the following specification taken with the accompanying drawing.

Referring to the drawing, there is generally shown a transparent absorption cell 10 containing a resonant medium 11 such as a mixture of a resonant gas and a buffer gas; a lamp or source 12 for producing photon radiation at the frequency of the resonant medium, and an optical system for producing circularly polarized radiation and regeneratively applying this radiation to optically pump the medium 11.

The gas employed within cell 10 may be a rubidium vapor at a pressure of the order of $10^{-6}$ mm. of mercury together with a buffer gas, such as argon at about 30 mm. of mercury. However, as known in the art sodium vapor, cesium or other alkali metal vapors may be employed as well as other buffer gases such as neon, helium or the like. A low pressure of rubidium vapor is used for minimizing relaxation due to rubidium-rubidium collisions. The buffer gas serves to inhibit collisions of the rubidium with the cell walls whereas the rubidium-buffer gas collisions do not cause appreciable relaxation or disorientation of the rubidium atoms.

The lamp 12 may be a rubidium vapor lamp to provide $D_1$ resonance radiation at 794.7 millimicrons, or a sodium lamp, cesium lamp or other may be employed corresponding to the resonant medium 11 selected for the absorption cell 10.

Unpolarized rays 21 from the lamp 12 are initially focused by a lens 13 to provide parallel rays along the axis of the system. An interference filter 14 is employed to remove the $D_2$ line at a frequency of 780 millimicrons and a combination of a linear polarizer plate 16 and a quarter wave plate are next employed in sequence along the path of the photon radiation 21 to produce circularly polarized radiation for illuminating the resonant medium within the transparent cell 10.

According to the invention, there is also applied a weak magnetic field (not shown) directed along the axis of the light rays so that the selection rule $\Delta MF = +1$ is operative. The reason underlying this selection rule is that each photon of circularly polarized light carries one unit of angular momentum that must be acquired by an atom of the gas interacting with the photon. After applying the magnetic field and light radiation for a given interval the atoms of the gas become polarized with a net angular momentum and an associated magnetic moment along the direction of the pumping light and the applied magnetic field. Accordingly, the gas 11 is optionally pumped and absorbs a reduced amount of resonance radiation.

Normally, in accordance with prior art practices, each photon of the circularly polarized pumping light from the lamp 12 passes through the absorption cell only once and the transfer of energy between the photon radiation and the resonant medium is therefore accomplished by means of a traveling wave of circularly polarized electromagnetic energy. According to the present invention, there is provided a process for regeneratively applying this radiation to the medium thereby to more efficiently couple the radiation to the medium.

Returning to the drawing, one preferred manner of performing this regenerative application of light energy is passing the light through a pair of interferometer plates 17 and 18 disposed in parallel on opposite sides of the cell 10. As shown, the first plate 17 is preferably comprised of a transparent planar member having a half silvered reflecting surface 20 facing the cell 10 on one side thereof and the opposite plate 18 is provided with a fully mirrored surface 19 facing the opposite side of the cell 10 and accurately parallel with the reflecting surface 20 of the first plate 17 to repetitively reflect light between the two mirror surfaces. These confronting mirrors provide what may be considered as an optically resonant cavity about the cell 10 to produce a standing wave of light energy therein, produced by light interference, instead of a traveling wave of photon electromagnetic energy as heretofore.

In operation, the circularly polarized light leaving the quarter wave plate 16 passes through the half silvered mirror surface 20 and thence through the resonant medium 11 where some of the energy is absorbed while a remaining portion reaches the mirror surface 19. At the surface 19, this remaining portion is reflected backwardly and regeneratively applied to the medium 11 where a portion thereof is again absorbed while the remainder reaches the first mirror surface 20. A light interference pattern is, therefore, established to produce standing waves of photon radiation within the resonant medium 11. These standing waves impart considerably greater energy to the medium than heretofore to enhance the pumping rate and efficiency of the system.

The dimensions of the mirror or reflecting surfaces in this arrangement are about as large as the distance between these surfaces thereby to accommodate a rather large absorption cell 10. For minimizing any undesirable light interaction between the walls of the absorption cell and the interferometer surfaces, the interferometer plates may alternatively be placed inside the cell 10 (not shown). Alternatively, the absorption cell itself may be formed with a pair of parallel walls provided with the mirror surfaces 19 and 20 to function as the interferometer plates (not shown).

Many other variations may also be made without departing from the spirit and scope of this invention and accordingly this invention should be considered as being limited only according to the following claims.

What is claimed is:

1. In an optical pumping system including an optical absorption cell containing a gas resonant at microwave radio frequencies, and including means for producing photon radiation at the resonant frequency of the gas, circularly polarizing said radiation, and illuminating the gas thereby to couple energy thereto, means for applying a magnetic field to the gas, the improvement comprising means for regeneratively applying the photon radiation to the gas to traverse the gas more than twice and increase the transfer of energy thereto, said means including an optical interferometer.

2. In the system of claim 1, said interfereometer comprising a pair of radiation reflectors disposed outside the absorption cell and in confronting relationship,
and means for introducing the photon radiation between the reflectors to successively traverse the gas.

3. In the system of claim 1, said interferometer comprising a pair of radiation reflecting means disposed with respect to the cell and with respect to the photon radiation to produce standing waves of the radiation within the gas.

4. In the system of claim 1, said interferometer comprising a pair of radiation reflector means in confronting relationship with the resonant gas between,
the reflecting means having a reflecting surface of dimensions approximating the distance between the surfaces thereby to accommodate a large absorption cell.

5. An optical pumping system comprising:
an absorption cell containing a microwave resonant medium and being transparent to photon radiation at the resonant frequency of the medium,
an optical system being energizable by a source of photon radiation at the resonant frequency of the medium, and comprising means for producing circularly polarized photon radiation at that frequency,
an interferometer being illuminated by said circularly polarized radiation for regeneratively applying the radiation to the absorption cell,
said interferometer providing a resonant cavity for the photon radiation at the resonant frequency thereby to produce standing waves of circularly polarized radiation within said medium to traverse said medium more than twice in order to increase the photon energy transfer to said medium.

References Cited by the Examiner

UNITED STATES PATENTS

| | | | |
|---|---|---|---|
| 2,884,524 | 4/1959 | Dicke | 88—1 |
| 3,098,112 | 7/1963 | Horton | 88—61 |
| 3,211,055 | 10/1965 | Andres | 88—61 |

OTHER REFERENCES

Boyle et al.: "A Continuously Operating Ruby Optical Maser," Applied Optics, vol. 1, No. 2, March 1962.

Kastler: "Atomes a l'Interieur d'un Interferometer Perot-Fabry," Applied Optics, vol. 1, No. 1, January 1962, pp. 17–24; pp. 22–24 specifically relied upon.

JEWELL H. PEDERSEN, *Primary Examiner.*

DAVID H. RUBIN, *Examiner.*

R. L. WIBERT, *Assistant Examiner.*